United States Patent
Zhou

(10) Patent No.: US 12,213,108 B2
(45) Date of Patent: Jan. 28, 2025

(54) METHOD AND APPARATUS FOR DETERMINING RESOURCE POSITION, BASE STATION AND STORAGE MEDIUM

(71) Applicant: BEIJING XIAOMI MOBILE SOFTWARE CO., LTD., Beijing (CN)

(72) Inventor: Juejia Zhou, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 798 days.

(21) Appl. No.: 17/246,306

(22) Filed: Apr. 30, 2021

(65) Prior Publication Data

US 2021/0258955 A1 Aug. 19, 2021

Related U.S. Application Data

(63) Continuation of application No. PCT/CN2018/113496, filed on Nov. 1, 2018.

(51) Int. Cl.
| | |
|---|---|
| *H04W 72/0446* | (2023.01) |
| *H04W 8/24* | (2009.01) |
| *H04W 72/51* | (2023.01) |

(52) U.S. Cl.
CPC ......... *H04W 72/0446* (2013.01); *H04W 8/24* (2013.01); *H04W 72/51* (2023.01)

(58) Field of Classification Search
CPC .... H04W 72/0446; H04W 8/24; H04W 72/51
See application file for complete search history.

(56) References Cited

U.S. PATENT DOCUMENTS

| | | |
|---|---|---|
| 2014/0192727 A1 | 7/2014 | Liu et al. |
| 2016/0119048 A1 | 4/2016 | Liu et al. |
| 2018/0014301 A1 | 1/2018 | Chen et al. |

(Continued)

FOREIGN PATENT DOCUMENTS

| | | | | |
|---|---|---|---|---|
| CN | 106559188 A | | 4/2017 | |
| CN | 107919948 A | * | 4/2018 | ........... H04L 1/1607 |

(Continued)

OTHER PUBLICATIONS

International Search Report and Written Opinion of the International Application No. PCT/CN2018/113496, mailed on Jul. 2, 2019 with English translation, (6p).

(Continued)

*Primary Examiner* — Jackie Zuniga Abad
(74) *Attorney, Agent, or Firm* — Arch & Lake LLP

(57) ABSTRACT

A method and apparatus for determining a resource position, a base station, and a storage medium are provided. The method includes: acquiring a specified transmission time difference representing a transmission time difference between a second band and a first band; determining a first resource position, which is a first-type resource position configured for a first device to transmit communication data in the first band; and determining a second resource position based on the first resource position, the specified transmission time difference, and at least one of following parameters: at least one second-type resource position of the first band or at least one second-type resource position of the second band. The second resource position is a second-type resource position configured for a second device to transmit feedback data of the communication data.

20 Claims, 11 Drawing Sheets

(56) References Cited

U.S. PATENT DOCUMENTS

| | | | |
|---|---|---|---|
| 2019/0260521 A1 | 8/2019 | Luo et al. | |
| 2019/0335496 A1* | 10/2019 | Li | H04L 1/1887 |
| 2019/0394798 A1* | 12/2019 | Tomeba | H04W 74/02 |
| 2022/0279519 A1* | 9/2022 | Liu | H04W 24/08 |

FOREIGN PATENT DOCUMENTS

| | | |
|---|---|---|
| CN | 108633016 A | 10/2018 |
| WO | 2015123845 A1 | 8/2015 |
| WO | 2017052345 A1 | 3/2017 |
| WO | 2018082059 A1 | 5/2018 |

OTHER PUBLICATIONS

Huawei et al., "CSI Feedback Enhancements for URLLC", 3GPP TSG RAN WG1 Meeting #92 R1-1801782, Mar. 2, 2018, (5p).
Extended European Search Report in the European Application No. 18938723.6, mailed on May 9, 2022, (9p).
ZTE, "NR PUCCH resource allocation", 3GPP TSG RAN WG1 NR Ad-Hoc#2, R1-1710117, Qingdao, China, Jun. 27-30, 2017, (7p).

* cited by examiner

METHOD AND APPARATUS FOR DETERMINING RESOURCE POSITION, BASE STATION AND STORAGE MEDIUM

CROSS-REFERENCE TO RELATED APPLICATION

This application is a Continuation Application of PCT International Application No. PCT/CN2018/113496, filed on Nov. 1, 2018, the content of which is incorporated herein by reference in its entirety for all purposes.

TECHNICAL FIELD

The present disclosure relates to the field of communication, and more particularly, to methods for determining a resource position, base stations, and storage media.

BACKGROUND

In a wireless communication system, a time varying characteristic and multipath fading of a wireless channel may impact data transmission and result in a data transmission failure. Therefore, for ensuring the reliability of data transmission, a Hybrid-Automatic Repeat reQuest (HARQ) mechanism is introduced. In a carrier aggregation scenario, a base station and a terminal may perform data transmission through multiple bands to enhance a bandwidth of a transmission channel, and the HARQ mechanism may be implemented through the multiple bands.

Data transmission of a base station and a terminal through a first band and a second band is taken as an example. Each of the first band and the second band includes an uplink resource position configured for the terminal to transmit data and a downlink resource position configured for the base station to transmit data, and a frequency of the first band is higher than a frequency of the second band. The base station may transmit communication data to the terminal through the downlink resource position of the first band. The terminal, after receiving the communication data, may detect whether the communication data is correctly received or not, acquire feedback data based on a detection result and transmit the feedback data to the base station through the uplink resource position of the second band such that the base station can determine to retransmit the communication data or continue to transmit a next piece of communication data based on the feedback data.

The device performance may be impacted by factors such as a frequency, a subcarrier spacing and a Cyclic Prefix (CP). Consequently, a transmission time difference between the first band and the second band is caused, the first band being later than the second band. Furthermore, a time when the terminal acquires feedback data may be after a starting time of the uplink resource position configured to transmit the feedback data in the second band, and thus the terminal cannot transmit the feedback data timely through the uplink resource position and is required to wait for a next uplink resource position to transmit the feedback data, resulting in delayed transmission of the feedback data.

SUMMARY

The present disclosure provides methods for determining a resource position, base stations, and storage media, which may solve the problem in related art. The technical solutions are implemented as follows.

According to a first aspect of embodiments of the present disclosure, a method for determining a resource position is provided. The method includes that a base station acquires a specified transmission time difference. The specified transmission time difference represents a transmission time difference between a second band and a first band and a frequency of the first band is higher than a frequency of the second band. Additionally, the base station determines a first resource position, and the first resource position is a first-type resource position configured for the first device to transmit communication data in the first band.

Further, the base station determines a second resource position based on the first resource position, the specified transmission time difference, and at least one of following parameters: at least one second-type resource position of the first band or at least one second-type resource position of the second band. The second resource position is a second-type resource position configured for the second device to transmit feedback data of the communication data. The first-type resource position is a resource position configured for the first device to transmit data, and the second-type resource position is a resource position configured for the second device to transmit data.

According to a second aspect of the embodiments of the present disclosure, a method for determining a resource position is provided. The method includes that a base station receives a service request, and the service request carries a preset time length and the service request is configured to instruct the first device to transmit communication data to the second device.

Additionally, the base station acquires a specified transmission time difference, and the specified transmission time difference represents a transmission time difference between a second band and a first band and a frequency of the first band is higher than a frequency of the second band.

Further, the base station determines a first resource position meeting a preset condition based on a first-type resource position of the first band, the specified transmission time difference, and at least one of following parameters: at least one second-type resource position of the first band or at least one second-type resource position of the second band. The first resource position is a first-type resource position configured for the first device to transmit the communication data in the first band and the preset condition includes that a feedback delay corresponding to the first resource position is less than the preset time length. Moreover, the first-type resource position is a resource position configured for the first device to transmit data, and the second-type resource position is a resource position configured for the second device to transmit data.

According to a third aspect of the embodiments of the present disclosure, a base station is provided. The base station includes a processor and memory storing instructions executable by the processor. The processor may be configured to acquire a specified transmission time difference. The specified transmission time difference represents a transmission time difference between a second band and a first band and a frequency of the first band is higher than a frequency of the second band.

Additionally, the processor may be configured to determine a first resource position and the first resource position is a first-type resource position configured for a first device to transmit communication data in the first band.

Further, the processor may be configured to determine a second resource position based on the first resource position, the specified transmission time difference, and at least one of following parameters: at least one second-type resource position of the first band or at least one second-type resource position of the second band. The second resource position is a second-type resource position configured for a second device to transmit feedback data of the communication data. The first-type resource position is a resource position configured for the first device to transmit data, and the second-type resource position is a resource position configured for the second device to transmit data.

According to a fourth aspect of the embodiments of the present disclosure, a base station is provided. The base station includes a processor; and memory storing instructions executable by the processor. The processor may be configured to receive a service request, and the service request carries a preset time length and the service request is configured to instruct a first device to transmit communication data to a second device.

Additionally, the processor may be configured to acquire a specified transmission time difference, the specified transmission time difference represents a transmission time difference between a second band and a first band, and a frequency of the first band is higher than a frequency of the second band.

Further, the processor may be configured to determine a first resource position meeting a preset condition based on a first-type resource position of the first band, the specified transmission time difference, and at least one of following parameters: at least one second-type resource position of the first band or at least one second-type resource position of the second band. The first resource position is a first-type resource position configured for the first device to transmit the communication data in the first band and the preset condition includes that a feedback delay corresponding to the first resource position is less than the preset time length.

Moreover, the first-type resource position is a resource position configured for the first device to transmit data, and the second-type resource position is a resource position configured for the second device to transmit data.

According to a fifth aspect of the embodiments of the present disclosure, a non-transitory computer-readable storage medium is provided, in which at least one instruction may be stored. The at least one instruction may be loaded and executed by a processor to implement the operations executed in the method for determining a resource position as described in the first aspect.

According to a sixth aspect of the embodiments of the present disclosure, a computer-readable storage medium is provided, in which at least one instruction may be stored. The at least one instruction may be loaded and executed by a processor to implement the operations executed in the method for determining a resource position as described in the second aspect.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

For making the purposes, technical solutions and advantages of the present disclosure clearer, the present disclosure will further be described below in combination with implementations and accompanying drawings in detail. Herein, schematic implementations of the present disclosure and descriptions thereof are adopted to explain the present disclosure and not intended to limit the present disclosure.

The embodiments of the present disclosure provide a method and apparatus for determining a resource position, a base station and a storage medium. The present disclosure will be described below in combination with the accompanying drawings in detail.

Figure 1:
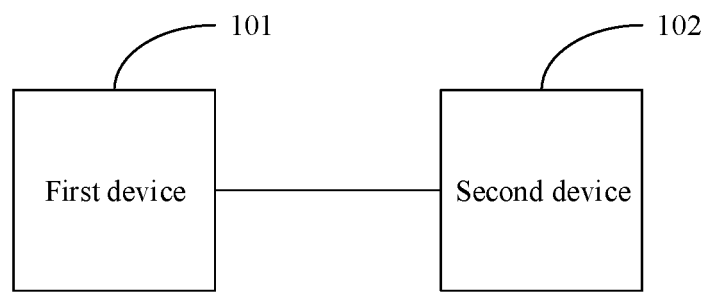
FIG. 1 is a structure diagram of a communication system according to an exemplary embodiment.

FIG. 1 is a structure diagram of a communication system according to an exemplary embodiment. As shown in FIG. 1, the communication system includes a first device 101 and a second device 102. The first device 101 is connected with the second device 102 through a communication network.

The first device 101 serves as a transmitter of communication data, and the second device 102 serves as a receiver of the communication data. A process that the first device 101 transmits data to the second device 102 may be called first-type data transmission, and a resource position configured to transmit the data may be called a first-type resource position. A process that the second device 102 transmits data to the first device 101 may be called second-type data transmission, and a resource position configured to transmit the data may be called a second-type resource position.

In the embodiments of the present disclosure, the first device 101 may transmit communication data to the second device 102 through a first-type resource position of a first band, and the second device 102, after receiving the communication data, may detect whether the communication data is correctly received or not, acquire feedback data based on a detection result and transmit the feedback data to the first device 101 through at least one second-type resource position of the first band or a second band.

When the first device 101 is a base station and the second device 102 is a terminal, the first-type resource position is a downlink resource position, and the second-type resource position is an uplink resource position.

Or, when the first device 101 is a terminal and the second device 102 is a base station, the first-type resource position is an uplink resource position, and the second-type resource position is a downlink resource position.

Figure 2:
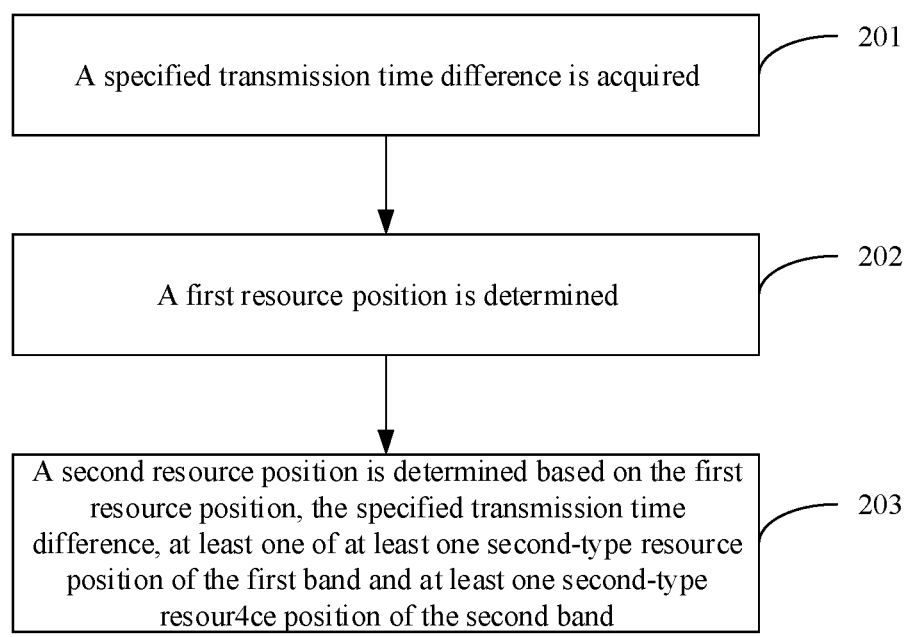
FIG. 2 is a flow chart showing a method for determining a resource position according to an exemplary embodiment.

FIG. 2 is a flow chart showing a method for determining a resource position according to an exemplary embodiment. The method is implemented by a base station which may be the first device or the second device shown in FIG. 1. As shown in FIG. 2, the method includes the following operations.

In Operation 201, a specified transmission time difference is acquired, the specified transmission time difference representing a transmission time difference between a second band and a first band, and a frequency of the first band being higher than a frequency of the second band.

In Operation 202, a first resource position is determined, the first resource position being a first-type resource position configured for a first device to transmit communication data in the first band.

In Operation 203, a second resource position is determined based on the first resource position, the specified transmission time difference and at least one of at least one second-type resource position of the first band or at least one second-type resource position of the second band, the second resource position being a second-type resource position configured for a second device to transmit feedback data of the communication data.

The first-type resource position is a resource position configured for the first device to transmit data, and the second-type resource position is a resource position configured for the second device to transmit data.

According to the method provided in the embodiment of the present disclosure, a specified transmission time difference is acquired, a first resource position configured for the first device to transmit the communication data in the first band is determined, and a second resource position is determined based on the first resource position, the specified transmission time difference and at least one of the at least one second-type resource position of the first band or the at least one second-type resource position of the second band, so that the second device can transmit feedback data of the communication data through the second resource position in addition to through the at least one second-type resource position of the second band. A proper second-type resource position may be selected from the second-type resource positions of the first band and the second band based on the specified transmission time difference. Therefore, the condition that the feedback data cannot be transmitted timely and thus there is brought a delayed transmission of the feedback data is avoided, and delay is shortened.

In a possible implementation, the operation that the second resource position is determined based on the first resource position, the specified transmission time difference and at least one of the at least one second-type resource position of the first band or the at least one second-type resource position of the second band may include that:

the second resource position is determined based on at least one of a second-type resource position after an ending time of the first resource position in the first band and a second-type resource position after a specified time in the second band, the specified time being later than the ending time by the specified transmission time difference.

In another possible implementation, the operation that the second resource position is determined based on at least one of the second-type resource position after the ending time of the first resource position in the first band and the second-type resource position after the specified time in the second band may include that:

a second-type resource position at a minimum distance from the first resource position is determined as the second resource position based on the second-type resource position after the ending time in the first band and the second-type resource position after the specified time in the second band.

In another possible implementation, the operation that the second resource position is determined based on the first resource position, the specified transmission time difference and at least one of the at least one second-type resource position of the first band or the at least one second-type resource position of the second band may include that:

when the specified transmission time difference is greater than a preset time difference, the second resource position is determined from the at least one second-type resource position of the first band based on the first resource position and the specified transmission time difference: or when the specified transmission time difference is not greater than the preset time difference, the second resource position is determined from the at least one second-type resource position of the second band based on the first resource position and the specified transmission time difference.

In another possible implementation, the operation that the specified transmission time difference is acquired may include that:

a transmission capability of a terminal is received, the transmission capability representing a magnitude of a transmission time difference of the terminal; and the specified transmission time difference is determined based on the transmission capability of the terminal, or, the specified transmission time difference corresponding to a lower transmission capability is determined based on a transmission capability of the base station and the transmission capability of the terminal.

In another possible implementation, the transmission capability may be a transmission time difference; the operation that the specified transmission time difference is determined based on the transmission capability of the terminal may include that:

the transmission time difference of the terminal is determined as the specified transmission time difference; and the operation that the specified transmission time difference corresponding to the lower transmission capability is determined based on the transmission capability of the base station and the transmission capability of the terminal may include that: a greater transmission time difference is determined from a transmission time difference of the base station and the transmission time difference of the terminal as the specified transmission time difference.

In another possible implementation, the transmission capability is a level of the transmission time difference.

The operation that the specified transmission time difference is determined based on the transmission capability of the terminal may include that:

based on a level of the terminal, determine any transmission time difference of the level as the specified transmission time difference.

The operation that the specified transmission time difference corresponding to the lower transmission capability is determined based on the transmission capability of the base station and the transmission capability of the terminal may include that:

a level of a greater transmission time difference is determined based on a level of the base station and the level of the terminal, and any transmission time difference of the level corresponding to the greater transmission time difference is determined as the specified transmission time difference.

In another possible implementation, the first device is the base station, and the second device is the terminal; and the method may further include that:

the communication data is transmitted to the terminal through the first resource position, and the feedback data transmitted by the terminal through the second resource position is received.

In another possible implementation, the first device is the terminal, and the second device is the base station; and the method may further include that:

the communication data transmitted by the terminal through the first resource position is received, and the feedback data is transmitted to the terminal through the second resource position.

Figure 3:
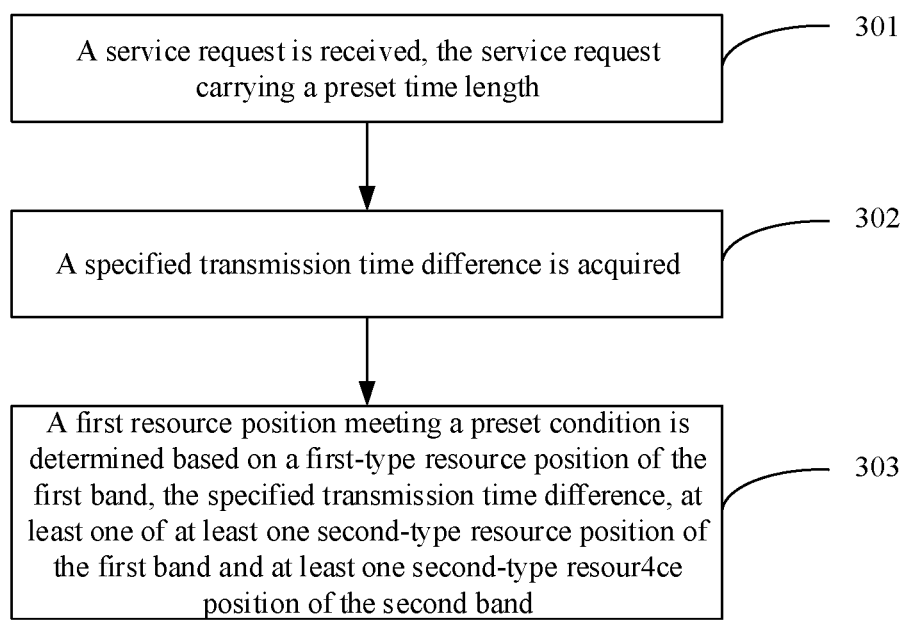
FIG. 3 is a flow chart showing a method for determining a resource position according to an exemplary embodiment.

FIG. 3 is a flow chart showing a method for determining a resource position according to an exemplary embodiment. The method is implemented by a base station which may be the first device or the second device shown in FIG. 1. As shown in FIG. 3, includes the following operations.

In Operation 301, a service request is received, the service request carrying a preset time length and the service request being configured to instruct a first device to transmit communication data to a second device.

In Operation 302, a specified transmission time difference is acquired, the specified transmission time difference representing a transmission time difference between a second band and a first band, and a frequency of the first band being higher than a frequency of the second band.

In Operation 303, a first resource position meeting a preset condition is determined based on a first-type resource position of the first band, the specified transmission time difference and at least one of at least one second-type resource position of the first band or at least one second-type resource position of the second band.

The first resource position is a first-type resource position configured for the first device to transmit the communication data in the first band, and the preset condition includes that a feedback delay corresponding to the first resource position is less than the preset time length. The first-type resource position is a resource position configured for the first device to transmit data, and the second-type resource position is a resource position configured for the second device to transmit data.

According to the method provided in the embodiment of the present disclosure, when a service request is received, a first resource position meeting the preset condition may be determined based on the first-type resource position of the first band, the specified transmission time difference and at least one of the at least one second-type resource position of the first band or the at least one second-type resource position of the second band, so that a first-type resource position with a feedback delay being less than the preset time length may be selected based on the preset time length of the service request and the specified transmission time difference between the first band and the second band. It is ensured that a requirement of the service request may be met when the communication data is transmitted through the first-type resource position. The condition that, when a response is given to the service request, feedback data cannot be transmitted timely and thus there is brought delayed transmission of the feedback data is avoided, and delay is shortened.

In a possible implementation, the operation that the first resource position meeting the preset condition is determined based on the first-type resource position of the first band, the specified transmission time difference and at least one of the at least one second-type resource position of the first band or the at least one second-type resource position of the second band may include that:

a first alternative resource position is determined based on the first-type resource position of the first band;

a feedback delay corresponding to the first alternative resource position is determined based on the first alternative resource position, the specified transmission time difference and at least one of the at least one second-type resource position of the first band or the at least one second-type resource position of the second band; and when the feedback delay is less than the preset time length, it is determined that the first alternative resource position meets the preset condition.

In another possible implementation, the method may further include that:

when the feedback delay is not less than the preset time length, it is determined that the first alternative resource position does not meet the preset condition.

In another possible implementation, the operation that the feedback delay corresponding to the first alternative resource position is determined based on the first alternative resource position, the specified transmission time difference and at least one of the at least one second-type resource position of the first band or the at least one second-type resource position of the second band may include that:

a second alternative resource position corresponding to the first alternative resource position is determined based on the first alternative resource position and at least one of a first second-type resource position after an ending time of the first alternative resource position in the first band and a first second-type resource position after an alternative specified time in the second band, the alternative specified time being later than the ending time by the specified transmission time difference; and a distance between the first alternative resource position and the second alternative resource position is determined as the feedback delay.

In another possible implementation, the operation that the second alternative resource position corresponding to the first alternative resource position is determined based on the first alternative resource position and at least one of the first second-type resource position after the ending time in the first band and the first second-type resource position after the alternative specified time in the second band may include that:

the first second-type resource position after the ending time in the first band is determined as the second alternative resource position; or, the first second-type resource position after the alternative specified time in the second band is determined as the second alternative resource position; or, a second-type resource position at a minimum distance from the first alternative resource position is determined as the second alternative resource position from the first second-type resource position after the ending time in the first band and the first second-type resource position after the alternative specified time in the second band.

In another possible implementation, the operation that the specified transmission time difference is acquired may include that:

a transmission capability of a terminal is received, the transmission capability representing a magnitude of a transmission time difference of the terminal; and the specified transmission time difference is determined based on the transmission capability of the terminal, or, the specified transmission time difference corresponding to a lower transmission capability is determined based on a transmission capability of the base station and the transmission capability of the terminal.

In another possible implementation, the transmission capability may be a transmission time difference.

The operation that the specified transmission time difference is determined based on the transmission capability of the terminal may include that:

the transmission time difference of the terminal is determined as the specified transmission time difference.

The operation that the specified transmission time difference corresponding to the lower transmission capability is determined based on the transmission capability of the base station and the transmission capability of the terminal may include that: a greater transmission time difference is determined from a transmission time difference of the base station and the transmission time difference of the terminal as the specified transmission time difference.

In another possible implementation, the transmission capability is a level of the transmission time difference.

The operation that the specified transmission time difference is determined based on the transmission capability of the terminal may include that:

based on a level of the terminal, determine any transmission time difference of the level as the specified transmission time difference.

The operation that the specified transmission time difference corresponding to the lower transmission capability is determined based on the transmission capability of the base station and the transmission capability of the terminal may include that:

a level of a greater transmission time difference is determined based on a level of the base station and the level of the terminal, and any transmission time difference of the level corresponding to the greater transmission time difference is determined as the specified transmission time difference.

Figure 4:
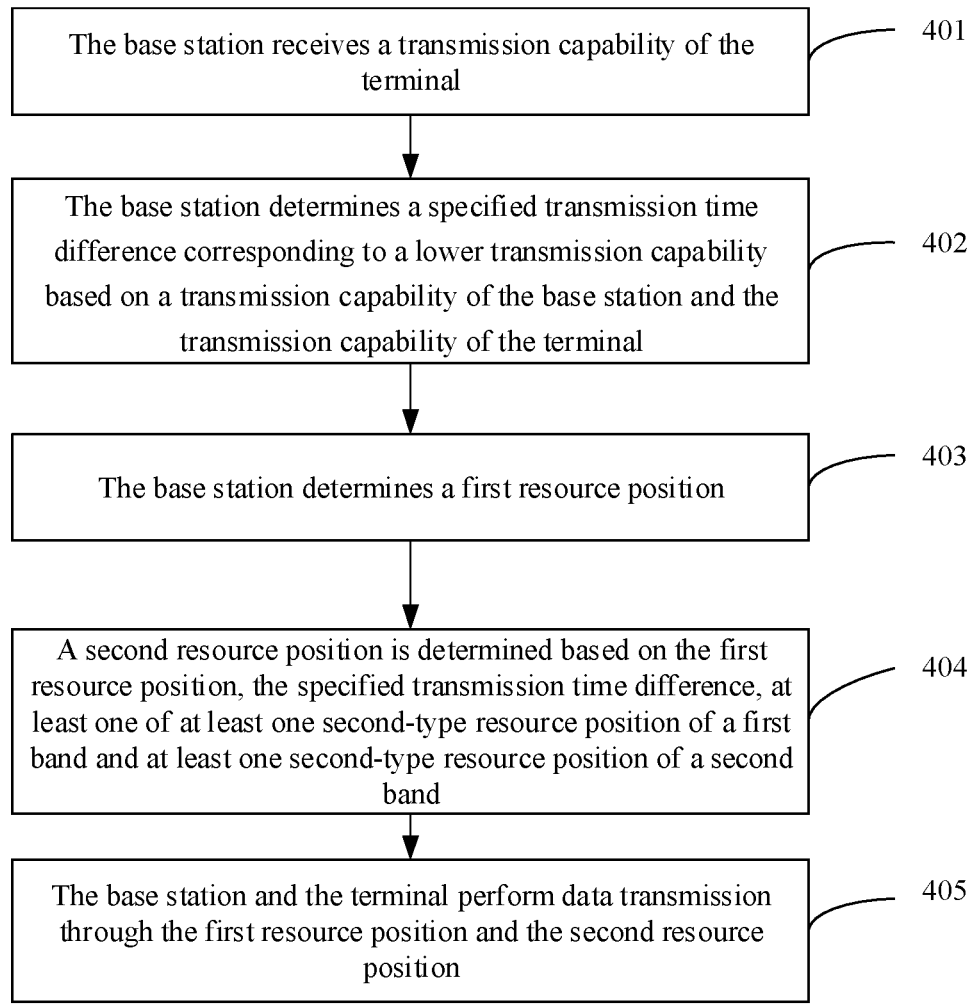
FIG. 4 is a flow chart showing a method for determining a resource position according to an exemplary embodiment.

FIG. 4 is a flow chart showing a method for determining a resource position according to an exemplary embodiment. An execution body is a base station. As shown in FIG. 4, the following operations are included.

In Operation 401, the base station receives a transmission capability of a terminal.

In a carrier aggregation scenario, a base station and a terminal may perform data transmission through a first band and a second band. A frequency of the first band is higher than a frequency of the second band, namely the real-time performance of the first band is higher and the reliability of the second band is higher. When a HARQ mechanism is implemented in the carrier aggregation scenario, for ensuring the reliability of feedback data, the feedback data may be transmitted in the second band in response to communication data transmitted in the first band.

However, since the device performance of the base station or the terminal may be impacted by different frequencies, when the base station or the terminal performs data transmission, synchronization cannot be implemented in the first band and the second band, and there may be a synchronization difference between the two bands. Therefore, there may be a time difference between the two bands. The time difference may be called a transmission time difference, and the transmission time difference may impact transmission of feedback data.

Therefore, the terminal may acquire its own transmission capability and transmit it to the base station. The base station may receive the transmission capability of the terminal to determine a transmission time difference based on the transmission capability.

The transmission capability represents a magnitude of the transmission time difference. The transmission time difference represents the transmission time difference between the first band and the second band, i.e., a difference between a time of the first band and a time of the second band. The transmission time difference may be a Maximum Reception Time Difference (MRTD) or a Maximum Transmission Time Difference (MTTD).

In a possible implementation, the terminal may transmit the transmission capability to the accessed base station when accessing a communication system, or, the terminal may also transmit the transmission capability to the base station when an aggregated carrier is configured.

In another possible implementation, the terminal may report the transmission capability through Radio Resource Control (RRC) signaling or a Medium Access Control-Control Element (MAC CE) or uplink physical signaling. The base station may receive the transmission capability in a corresponding physical layer.

In Operation 402, the base station determines the specified transmission time difference corresponding to a lower transmission capability based on a transmission capability of the base station and the transmission capability of the terminal.

Since the transmission capabilities of the base station and the terminal may be different, the base station, after receiving the transmission capability of the terminal, may comprehensively consider the transmission capabilities of the base station and the terminal to determine the specified transmission time difference to be adopted during data transmission between the base station and the terminal.

In the embodiments of the present disclosure, the base station may compare the transmission capability of the terminal with the transmission capability of the base station, thereby determining the lower transmission capability and further determining a transmission time difference corresponding to the lower transmission capability as the specified transmission time difference.

That the transmission capability is lower refers to that the transmission time difference represented by the transmission capability is greater. That the transmission capability is higher refers to that the transmission time difference represented by the transmission capability is smaller. Selecting the transmission time difference corresponding to the lower transmission capability may consider the transmission capabilities of the two devices and consider an impact of the greater transmission time difference on a feedback delay to make the device with the higher transmission capability adaptable to the device with the lower transmission capability.

In a possible implementation, the transmission capability is a transmission time difference. The base station may directly compare the transmission time difference of the base station with the transmission time difference of the terminal and determine the greater transmission time difference as the specified transmission time difference. For example, when the transmission time difference of the base station is 33 microseconds and the transmission time difference of the terminal is 8 microseconds, it is determined that the specified transmission time difference is 33 microseconds.

In another possible implementation, the transmission capability is a level of the transmission time difference. The base station may divide multiple levels based on possible transmission time differences and determine a magnitude of the transmission time difference based on the level. Therefore, a level of the base station and a level of the terminal are compared to determine a level of a greater transmission time difference, and any transmission time difference of the level corresponding to the greater transmission time difference may be determined as the specified transmission time difference.

Each level includes a transmission time difference range, and the range may be a continuous time difference range or may also include one or more discrete time differences. The level may be represented in multiple forms such as a numeral and a character. The multiple levels have priorities, and a sequence of the multiple levels may be determined according to the priorities.

Under a first condition, a higher level represents a smaller transmission time difference, and a lower level represents a greater transmission time difference. The base station may compare the level of the base station with the level of the terminal to determine the lower level and determine any transmission time difference of the level as the specified transmission time difference.

For example, the transmission time difference range corresponding to each level is shown in the following Table 1. When a numerical value of a level is greater, it indicates that the level is higher. When the level of the base station is 0 and the level of the terminal is 1, it is determined that the lower level is level 0. 32 is selected from the transmission time difference range [31, 33] as the specified transmission time difference.

TABLE 1

| Level | Transmission time difference range (unit: microsecond) |
| --- | --- |
| 0 | 31-33 |
| 1 | 17-19 |
| 2 | 8-10 |

Under a second condition, a higher level represents a greater transmission time difference, and a lower level represents a smaller transmission time difference. The base station may compare the level of the base station with the level of the terminal to determine the higher level and determine any transmission time difference of the level as the specified transmission time difference.

After the specified transmission time difference is determined, the base station may perform data transmission based on the specified transmission time difference and transmit the determined specified transmission time difference to the terminal. The terminal may receive the specified transmission time difference and perform data transmission based on the specified transmission time difference.

The base station may transmit the specified transmission time difference through RRC signaling or a MAC CE or downlink physical signaling.

It is to be noted that descriptions are made in the embodiment of the present disclosure taking comprehensive consideration of the transmission capabilities of the base station and the terminal as an example. In another embodiment of the present disclosure, the transmission capability of the base station is usually higher than the transmission capability of the terminal and the transmission capability of the terminal is the lower in the two transmission capabilities, so that the base station may also determine the specified transmission time difference by default based on the transmission capability of the terminal, namely the transmission time difference corresponding to the transmission capability of the terminal may be directly determined as the specified transmission time difference. In such a case, the terminal can learn about its own transmission time difference, so that the base station is not required to transmit the specified transmission time difference to the terminal.

In a possible implementation, the transmission capability is the transmission time difference. The base station may receive the transmission capability of the terminal and directly determine the transmission time difference indicated by the transmission capability of the terminal as the specified transmission time difference.

In another possible implementation, the transmission capability is the level of the transmission time difference. The base station, after receiving the transmission capability of the terminal, may determine any transmission time difference of the level based on the level indicated by the transmission capability and determine the transmission time difference as the specified transmission time difference.

Based on the examples of Table 1, when the level of the terminal is 1, 17 is selected from the transmission time difference range [17, 19] as the specified transmission time difference.

In Operation 403, the base station determines a first resource position.

In the embodiment of the present disclosure, the condition that a first device transmits communication data to a second device is taken as an example. The first device may be any one of the base station and the terminal, and the second device is thus the other one. A resource position configured for the first device to transmit data is a first-type resource position, and a resource position configured for the second device to transmit data is a second-type resource position. Therefore, when the first device is the base station and the second device is the terminal, the first-type resource position is a downlink resource position, and the second-type resource position is an uplink resource position. Or, when the first device is the terminal and the second device is the base station, the first-type resource position is an uplink resource position, and the second-type resource position is a downlink resource position.

For facilitating data transmission between the base station and the terminal, the base station is required to configure the first resource position in advance for the terminal. The first resource position is a first-type resource position configured for the first device to transmit communication data in the first band, and may be any first-type resource position in the first band or may be a first-type resource position selected by the base station from the first band and meeting a preset condition. The preset condition may be determined by the base station or determined by negotiation between the base station and the terminal.

In Operation 404, a second resource position is determined based on the first resource position, the specified transmission time difference and at least one of at least one second-type resource position of a first band and at least one second-type resource position of a second band.

The second resource position is a second-type resource position configured for the second device to transmit feedback data of the communication data. For facilitating data transmission between the base station and the terminal, the base station is required to configure the second resource position in advance for the terminal.

Since the second-type resource configurations are set in both the first band and the second band for the second device to transmit the feedback data, for ensuring a lower feedback delay, the second resource position may be determined from the second-type resource positions of the first band and the second band based on the first resource position and the specified transmission time difference.

In a possible implementation, Operation 404 may include the following Operation 4041.

In Operation 4041, a time later than an ending time of the first resource position by the specified transmission time difference is determined as a specified time, and the second resource position is determined based on at least one of a second-type resource position after the ending time in the first band and a second-type resource position after the specified time in the second band.

The ending time of the first resource position may be considered to be a time when the second device receives the communication data in the first band. Since the frequency of the first band is higher than the frequency of the second band, there is a transmission time difference between the first band and the second band, and the time of the second device in the first band is later than the time in the second band by the specified transmission time difference. In the first band, the feedback data cannot be transmitted timely through a second-type resource position before the ending time, and the feedback data may be transmitted through the second-type resource position after the ending time. In the second band, the feedback data cannot be transmitted timely through a second-type resource position before the specified time, and the feedback data may be transmitted through the second-type resource position after the specified time.

Therefore, the base station may determine the second resource position based on at least one of the second-type resource position after the ending time in the first band and the second-type resource position after the specified time in the second band.

For example, the second-type resource position after the ending time in the first band and the second-type resource position after the specified time in the second band may be acquired, a distance between each acquired second-type resource position and the first resource position may be determined, a second-type resource position at a minimum distance from the first resource position may be determined, and the second-type resource position may be determined as the second resource position. Therefore, the earliest second-type resource position adaptable to transmit feedback data may be selected, a feedback delay is reduced, delayed transmission of the feedback data is avoided as much as possible, and it is ensured that the second device can transmit the feedback data of the communication data timely to the first device.

A distance between any two resource positions may be determined based on a time interval between starting times of the two resource positions, a time interval between middle times or a time interval between ending times, etc.

In another possible implementation, a preset time difference may be set in the base station. The preset time difference is a maximum transmission time difference allowed for transmission of feedback data of communication data by the second device to the first device in the second band. It is determined whether to adopt the at least one second-type resource position of the first band or the at least one second-type resource position of the second band according to a magnitude relationship between the specified transmission time difference and the preset time difference.

Operation 404 may include the following Operations 4042 and 4043.

In Operation 4042, when the specified transmission time difference is greater than a preset time difference, the specified transmission time difference is greater, and consequently, the feedback delay may be excessively long if the second device transmits the feedback data in the second band. Therefore, the second resource position is determined from the at least one second-type resource position of the first band based on the first resource position and the specified transmission time difference to transmit the feedback data through the at least one second-type resource position of the second band to avoid the impact of the transmission time difference and shorten the feedback delay as much as possible.

For example, a first second-type resource position after the ending time in the first band may be acquired, and the second-type resource position may be determined as the second resource position.

In Operation 4043, when the specified transmission time difference is less than the preset time difference, the specified transmission time difference is smaller, and when the second device transmits the feedback data in the second band, the reliability may be ensured and the condition that the feedback delay is excessively long is avoided. Therefore, the second resource position is determined from the at least one second-type resource position of the second band based on the first resource position and the specified transmission time difference.

For example, the time later than the ending time of the first resource position by the specified transmission time difference is determined as the specified time, a first second-type resource position after the specified time in the second band is acquired, and the second-type resource position is determined as the second resource position.

In Operation 405, the base station and the terminal perform data transmission through the first resource position and the second resource position.

The base station, after configuring the first resource position and the second resource position, may transmit the first resource position and the second resource position to the terminal. Then, the base station may transmit data to the terminal through the first resource position and the second resource position.

That is, when the first device is the base station and the second device is the terminal, the base station may transmit communication data to the terminal through the first resource position; the terminal may receive the communication data through the first resource position, detect whether the communication data is correctly received or not, determine feedback data based on a detection result and transmit the feedback data through the second resource position; and the base station may receive the feedback data through the second resource position, thereby determining whether the communication data is required to be retransmitted or not.

When the first device is the terminal and the second device is the base station, the terminal may transmit communication data to the base station through the first resource position; the base station may receive the communication data through the first resource position, detect whether the communication data is correctly received or not, determine feedback data based on a detection result and transmit the feedback data through the second resource position; and the terminal may receive the feedback data through the second resource position, thereby determining whether the communication data is required to be retransmitted or not.

The feedback data may be an Acknowledgement (ACK) or a Nacknowledgement (NACK). The ACK represents that the terminal correctly receives the communication data, and the NACK represents that the terminal does not correctly receive the communication data.

According to the method provided in the embodiments of the present disclosure, a specified transmission time difference may be acquired, a first resource position configured for a first device to transmit communication data in a first band may be determined, and a second resource position may be determined based on the first resource position, the specified transmission time difference and at least one of at least one second-type resource position of the first band and at least one second-type resource position of a second band, so that the second device may transmit feedback data of the communication data through the second resource position in addition to through the at least one second-type resource position of the second band. A proper second-type resource position may be selected from the second-type resource positions of the first band and the second band based on the specified transmission time difference. Therefore, the condition that feedback data cannot be transmitted timely and thus there is brought delayed transmission of the feedback data is avoided, and delay is shortened.

Figure 5:
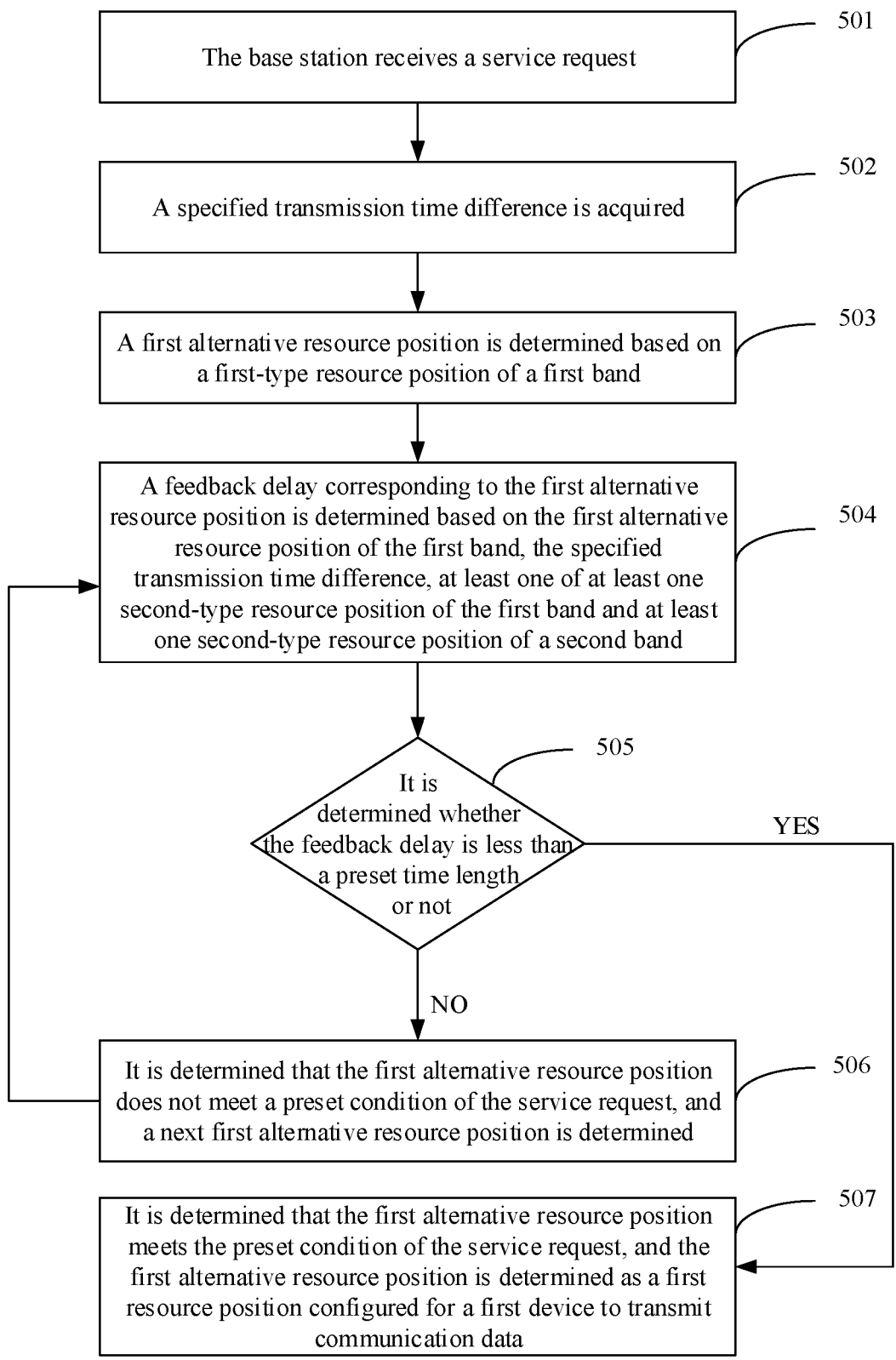
FIG. 5 is a flow chart showing a method for determining a resource position according to an exemplary embodiment.

FIG. 5 is a flow chart showing a method for determining a resource position according to an exemplary embodiment. In the embodiment, an execution body is a base station. As shown in FIG. 5, the following operations are included.

In Operation 501, the base station receives a service request.

The service request may be any service request received in a running process of the base station, such as a request of an Ultra Reliable Low Latency Communication (URLLC) service or a request of an enhanced Mobile Broad Band (eMBB) service. The service request is configured to instruct a first device to transmit communication data to a second device.

The first device may be any one of the base station and a terminal, and the second device is thus the other one. Therefore, the first device is the base station and the second device is the terminal, or, the first device is the terminal and the second device is the base station.

The service request may carry a preset time length. The preset time difference may be a maximum feedback delay allowed by the service request, and a feedback delay may be determined by a distance between a first-type resource position for transmitting the communication data and a second-type resource position for transmitting feedback data. Equivalently, a preset condition may be set in the service request to require the feedback delay to be less than the preset time length.

Therefore, the base station, when receiving the service request, may acquire a specified transmission time difference and select a first-type resource position meeting the preset time length from multiple first-type resource positions based on the specified transmission time difference to transmit the communication data to respond to the service request.

In Operation 502, a specified transmission time difference is acquired.

Operation 502 is similar to Operation 402, detailed descriptions may refer to Operation 402. Elaborations are omitted herein.

In Operation 503, a first alternative resource position is determined based on a first-type resource position of a first band.

For selecting a first-type resource position meeting the preset condition every time, the base station may acquire any first-type resource position of the first band, determine the first-type resource position as the first alternative resource position and determine the first alternative resource position based on the following operations to determine whether the first alternative resource position meets the preset condition or not.

In Operation 504, a feedback delay corresponding to the first alternative resource position is determined based on the first alternative resource position of the first band, the specified transmission time difference and at least one of at least one second-type resource position of the first band and at least one second-type resource position of a second band.

After the first alternative resource position is selected, a corresponding second alternative resource position may be selected from the first band or the second band, and the feedback delay may be determined based on a distance between the first alternative resource position and the second alternative resource position. The second alternative resource position is a second-type resource position.

Operation 504 may include that: a time later than an ending time of the first alternative resource position by the specified transmission time difference is determined as an alternative specified time, a first second-type resource position after the ending time in the first frequency and a first second-type resource position after the alternative specified time in the second band are acquired, the second alternative resource position corresponding to the first alternative resource position is determined based on the first alternative resource position and at least one of the first second-type resource position after the ending time in the first band and the first second-type resource position after the alternative specified time in the second band, and a distance between the first alternative resource position and the second alternative resource position is determined as the feedback delay.

In a possible implementation, the first second-type resource position after the ending time in the first band may be determined as the second alternative resource position. Or, the first second-type resource position after the alternative specified time in the second band may be determined as the second alternative resource position.

Or, a time interval between a second-type resource position after the ending time in the first band and the first alternative resource position and a time interval between a second-type resource position after the alternative specified time in the second band and the first alternative resource position may be determined, thereby obtaining distances between one or more second-type resource positions and the first alternative resource position, the second-type resource position at a minimum distance from the first alternative resource position is determined, and the second-type resource position is determined as the second alternative resource position.

In Operation 505, it is determined whether the feedback delay is less than a preset time length or not; if NOT, Operation 506 is executed, otherwise if YES, Operation 507 is executed.

In Operation 506, it is determined that the first alternative resource position does not meet a preset condition of the service request, a next first alternative resource position is determined, and Operation 504 is executed.

After the feedback delay is determined, the feedback delay may be compared with the preset time length. When the feedback delay is not less than the preset time length, it indicates that, if the communication data is transmitted through the first alternative resource position, the feedback delay is excessively long and the requirement of the service request cannot be met. Therefore, it is determined that the first alternative resource position does not meet the preset condition, the next first alternative resource position is determined, and then Operation 504 is executed to continue making a determination.

In Operation 507, it is determined that the first alternative resource position meets the preset condition of the service request, and the first alternative resource position is determined as a first resource position configured for a first device to transmit communication data.

When the feedback delay is less than the preset time length, it indicates that, if the communication data is transmitted through the alternative resource position, the feedback delay may be not too long and the requirement of the service request on the feedback delay may be met. Therefore, it is determined that the first alternative resource position meets the preset condition. In such a case, the base station may determine the first alternative resource position as a first-type resource position to be adopted presently.

Furthermore, it may further be determined whether the first alternative resource position meets other conditions of the service request or not. When all the other conditions are met, the first alternative resource position may be determined as the first resource position. When any one of the other conditions is not met, the next first alternative resource position may be determined, and then Operation 504 is executed to continue making a determination until the first resource position is determined. Or, when it is determined that all first-type resource positions of the first band do not meet the conditions of the service request, the service request is denied.

For example, after it is determined that the first alternative resource position meets the preset condition about the feedback delay, a signal to noise ratio of the first resource position may also be considered, and it is determined whether the signal to noise ratio of the first alternative resource position is higher than a minimum signal to noise ratio of the service request.

Figure 6:
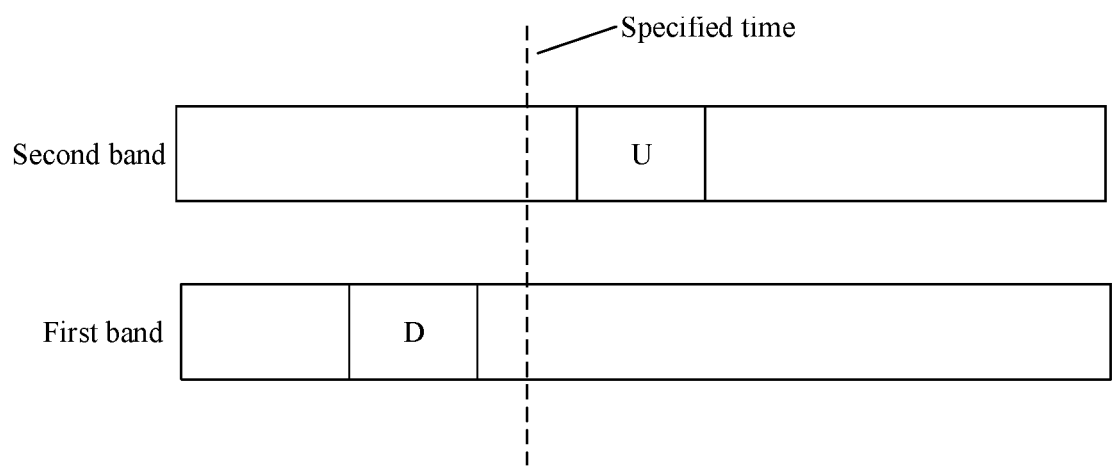
FIG. 6 is a schematic diagram illustrating a specified time and resource positions according to an exemplary embodiment.

In the embodiment of the present disclosure, FIG. 6 is a schematic diagram illustrating a specified time and resource positions according to an exemplary embodiment. As shown in FIG. 6, the base station transmits communication data at a downlink resource position D of the first band. An uplink resource position U of the second band is after the specified time, so that feedback data of the communication data may be transmitted at the uplink resource position U of the second band.

Figure 7:
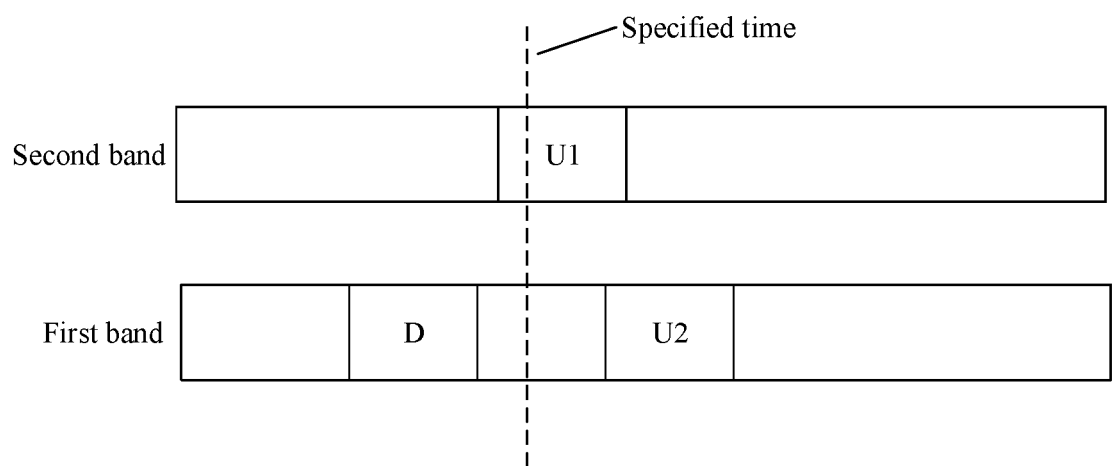
FIG. 7 is another schematic diagram illustrating a specified time and resource positions according to an exemplary embodiment.

FIG. 7 is another schematic diagram illustrating a specified time and resource positions according to an exemplary embodiment. As shown in FIG. 7, the base station transmits communication data at a downlink resource position D of the first band. A starting time of an uplink resource position U1 of the second band is before the specified time, so that the feedback data of the communication data cannot be transmitted at the uplink resource position U1 of the second band. A starting time of an uplink resource position U2 of the first band is after an ending time of the downlink resource position D of the first band, so that the feedback data of the communication data may be transmitted through the uplink resource position U2 of the first band.

According to the method provided in the embodiments of the present disclosure, when a service request is received, a first resource position meeting a preset condition may be determined based on the first-type resource position of the first band, the specified transmission time difference and at least one of at least one second-type resource position of a first band and at least one second-type resource position of a second band, so that a first-type resource position with a feedback delay being less than the preset time length may be selected based on the preset time length of the service request and the specified transmission time difference between the first band and the second band, it is ensured that a requirement of the service request may be met when the communication data is transmitted through the first-type resource position. The condition that feedback data cannot be transmitted timely when a response is given to the service request and thus there is brought delayed transmission of the feedback data is avoided, and delay is shortened.

The first point to be noted is that the embodiment shown in FIG. 4 and the embodiment shown in FIG. 5 may be combined to form a possible implementation of the embodiments of the present disclosure.

In such case, the base station, when receiving the service request, may determine the first resource position by the embodiment shown in FIG. 5 and then determine the second resource position corresponding to the first resource position by the embodiment shown in FIG. 4. After the first resource position and the second resource position are configured, the first device may transmit the communication data through the first resource position, and the second device may transmit the feedback data of the communication data through the second resource position.

The second point to be noted is that descriptions are made in the embodiments of the present disclosure taking data transmission of the base station and the terminal through the first band and the second band as an example. The first band and the second band may belong to the same mobile communication system. Or, in an inter-band scenario, the first band and the second band may belong to different mobile communication systems. The mobile communication system may include Long Term Evolution (LTE), 5th-Generation (5G) New Radio (NR), etc.

Moreover, the second band may be taken as a reference band, while the first band may include multiple bands. Under the condition that the base station and the terminal access multiple bands, the first-type resource position for transmitting communication data or the second-type resource position for transmitting feedback data may be determined based on transmission time differences between the multiple bands and the second band. A determination manner is similar to that in the abovementioned embodiments and will not be elaborated herein.

Figure 8:
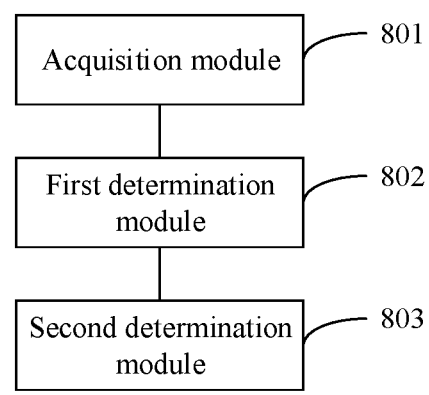
FIG. 8 is a block diagram of an apparatus for determining a resource position according to an exemplary embodiment.

FIG. 8 is a block diagram of an apparatus for determining a resource position according to an exemplary embodiment. Referring to FIG. 8, the apparatus includes an acquisition module 801, a first determination module 802 and a second determination module 803.

The acquisition module 801 is configured to acquire a specified transmission time difference, the specified transmission time difference representing a transmission time difference between a second band and a first band and a frequency of the first band being higher than a frequency of the second band.

The first determination module 802 is configured to determine a first resource position, the first resource position being a first-type resource position configured for a first device to transmit communication data in the first band.

The second determination module 803 is configured to determine a second resource position based on the first resource position, the specified transmission time difference and at least one of at least one second-type resource position of the first band or at least one second-type resource position of the second band, the second resource position being a second-type resource position configured for a second device to transmit feedback data of the communication data.

The first-type resource position is a resource position configured for the first device to transmit data, and the second-type resource position is a resource position configured for the second device to transmit data.

In a possible implementation, the second determination module 803 includes:
  a first determination unit, configured to determine the second resource position based on at least one of a second-type resource position after an ending time of the first resource position in the first band and a second-type resource position after a specified time in the second band, the specified time being later than the ending time by the specified transmission time difference.

In another possible implementation, the first determination unit may include:
  a determination subunit, configured to determine a second-type resource position at a minimum distance from the first resource position as the second resource position based on the second-type resource position after the ending time in the first band and the second-type resource position after the specified time in the second band.

In another possible implementation, the second determination module 803 may include:
  a second determination unit, configured to, when the specified transmission time difference is greater than a preset time difference, determine the second resource position from the at least one second-type resource position of the first band based on the first resource position and the specified transmission time difference; and
  the second determination unit is further configured to, when the specified transmission time difference is not greater than the preset time difference, determine the second resource position from the at least one second-type resource position of the second band based on the first resource position and the specified transmission time difference.

In another possible implementation, the acquisition module 801 may include:
  a receiving unit, configured to receive a transmission capability of a terminal, the transmission capability representing a magnitude of a transmission time difference of the terminal, and
  a time difference determination unit, configured to determine the specified transmission time difference based on the transmission capability of the terminal; or,
  the time difference determination unit is further configured to determine the specified transmission time difference corresponding to a lower transmission capability based on a transmission capability of a base station and the transmission capability of the terminal.

In another possible implementation, the transmission capability is a transmission time difference.

The time difference determination unit may include:
  a time difference determination subunit, configured to determine the transmission time difference of the terminal as the specified transmission time difference; and further configured to determine a greater transmission time difference from a transmission time difference of the base station and the transmission time difference of the terminal as the specified transmission time difference.

In another possible implementation, the transmission capability is a level of the transmission time difference.

The time difference determination unit may include:
  a time difference determination subunit, configured to, based on a level of the terminal, determine any transmission time difference of the level as the specified transmission time difference; and further configured to determine a level of a greater transmission time difference based on a level of the base station and the level of the terminal and determine any transmission time difference of the level corresponding to the greater transmission time difference as the specified transmission time difference.

In another possible implementation, the first device is the base station, and the second device is the terminal.

The apparatus may further include:
  a transmitting module, configured to transmit the communication data to the terminal through the first resource position, and
  a receiving module, configured to receive the feedback data transmitted by the terminal through the second resource position.

In another possible implementation, the first device is the terminal, and the second device is the base station; and the apparatus may further include:
  the receiving module, configured to receive the communication data ebb transmitted by the terminal through the first resource position, and
  the transmitting module, configured to transmit the feedback data to the terminal through the second resource position.

According to the apparatus provided in the embodiments of the present disclosure, a specified transmission time difference may be acquired, a first resource position configured for a first device to transmit communication data in a first band may be determined, and a second resource position may be determined based on the first resource position, the specified transmission time difference and at least one of at least one second-type resource position of the first band and at least one second-type resource position of a second band, so that the second device can transmit feedback data of the communication data through the second resource position in addition to through the at least one second-type resource position of the second band. A proper second-type resource position may be selected from the second-type resource positions of the first band and the second band based on the specified transmission time difference. Therefore, the condition that the feedback data cannot be transmitted timely and thus there is brought a delayed transmission of the feedback data is avoided, and delay is shortened.

It is to be noted that: when determining the resource positions, the apparatus for determining a resource position provided in the embodiments is only described taking each abovementioned functional module as an example. During a practical application, the abovementioned functions may be allocated to different functional modules for realization according to a requirement, namely an internal structure of the base station may be divided into different functional modules to realize all or part of the functions described above. In addition, the apparatus for determining a resource position provided in the embodiments belongs to the same concept of the method for determining a resource position embodiments and details about a specific implementation process thereof refer to the method embodiment and will not be elaborated herein.

Figure 9:
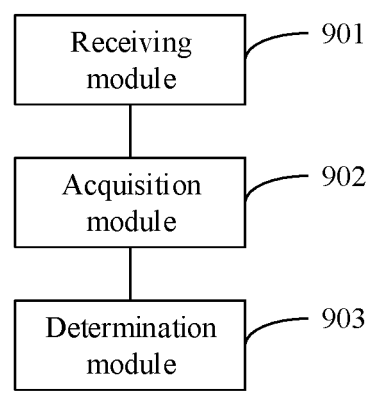
FIG. 9 is a block diagram of an apparatus for determining a resource position according to an exemplary embodiment.

FIG. 9 is a block diagram of an apparatus for determining a resource position according to an exemplary embodiment. Referring to FIG. 9, the apparatus includes a receiving module 901, an acquisition module 902 and a determination module 903.

The receiving module 901 is configured to receive a service request, the service request carrying a preset time length and the service request being configured to instruct a first device to transmit communication data to a second device.

The acquisition module 902 is configured to acquire a specified transmission time difference, the specified transmission time difference representing a transmission time difference between a second band and a first band, and a frequency of the first band being higher than a frequency of the second band.

The determination module 903 is configured to determine a first resource position meeting a preset condition based on a first-type resource position of the first band, the specified transmission time difference and at least one of at least one second-type resource position of the first band or at least one second-type resource position of the second band, the first resource position being a first-type resource position configured for the first device to transmit the communication data in the first band, and the preset condition including that a feedback delay corresponding to the first resource position is less than the preset time length.

The first-type resource position is a resource position configured for the first device to transmit data, and the second-type resource position is a resource position configured for the second device to transmit data.

In a possible implementation, the determination module 903 may include:
 a position determination unit, configured to determine a first alternative resource position based on the first-type resource position of the first band;
 a delay determination unit, configured to determine a feedback delay corresponding to the first alternative resource position based on the first alternative resource position, the specified transmission time difference and at least one of at least one second-type resource position of the first band or the at least one second-type resource position of the second band; and
 a preset condition determination unit, configured to, when the feedback delay is less than the preset time length, determine that the first alternative resource position meets the preset condition.

In another possible implementation, the preset condition determination unit is further configured to, when the feedback delay is not less than the preset time length, determine that the first alternative resource position does not meet the preset condition.

In another possible implementation, the delay determination unit may further include:
 a position determination subunit, configured to determine a second alternative resource position corresponding to the first alternative resource position based on the first alternative resource position and at least one of a first second-type resource position after an ending time of the first alternative resource position in the first band and a first second-type resource position after an alternative specified time in the second band, the alternative specified time being later than the ending time by the specified transmission time difference; and
 a delay determination subunit, configured to determine a distance between the first alternative resource position and the second alternative resource position as the feedback delay.

In another possible implementation, the position determination subunit is further configured to:
 determine the first second-type resource position after the ending time in the first band as the second alternative resource position; or,
 determine the first second-type resource position after the alternative specified time in the second band as the second alternative resource position; or,
 determine a second-type resource position at a minimum distance from the first alternative resource position as the second alternative resource position based on the first second-type resource position after the ending time in the first band and the first second-type resource position after the alternative specified time in the second band.

In another possible implementation, the acquisition module 902 may further include:
 a receiving unit, configured to receive a transmission capability of a terminal, the transmission capability representing a magnitude of a transmission time difference of the terminal, and
 a time difference determination unit, configured to determine the specified transmission time difference based on the transmission capability of the terminal; or,
 the time difference determination unit is configured to determine the specified transmission time difference corresponding to a lower transmission capability based on a transmission capability of a base station and the transmission capability of the terminal.

In another possible implementation, the transmission capability is a transmission time difference.

The time difference determination unit is further configured to:
 determine the transmission time difference of the terminal as the specified transmission time difference; or,
 determine a greater transmission time difference from a transmission time difference of the base station and the transmission time difference of the terminal as the specified transmission time difference.

In another possible implementation, the transmission capability is a level of the transmission time difference.

The time difference determination unit is further configured to:
 based on a level of the terminal, determine any transmission time difference of the level as the specified transmission time difference; and
 determine a level of a greater transmission time difference based on a level of the base station and the level of the terminal and determine any transmission time difference of the level corresponding to the greater transmission time difference as the specified transmission time difference.

According to the apparatus provided in the embodiments of the present disclosure, when a service request is received, a first resource position meeting a preset condition may be determined based on the first-type resource position of the first band, the specified transmission time difference and at least one of at least one second-type resource position of a first band and at least one second-type resource position of a second band, so that a first-type resource position with a feedback delay being less than the preset time length may be selected based on the preset time length of the service request and the specified transmission time difference between the first band and the second band. It is ensured that a requirement of the service request may be met when the communication data is transmitted through the first-type resource position. The condition that, when a response is given to the service request, feedback data cannot be transmitted timely and thus there is brought a delayed transmission of the feedback data is avoided, and delay is shortened.

It is to be noted that: when determining the resource positions, the apparatus for determining a resource position provided in the embodiments is only described taking division of abovementioned functional modules as an example. During a practical application, the abovementioned functions may be allocated to different functional modules for realization according to a requirement, namely an internal structure of the base station may be divided into different functional modules to realize all or part of the functions described above. In addition, the apparatus for determining a resource position provided in the embodiments belongs to the same concept of the method for determining a resource position embodiments and details about a specific implementation process thereof refer to the method embodiments and will not be elaborated herein.

Figure 10:
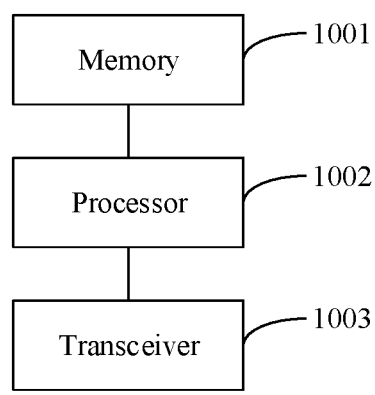
FIG. 10 is a block diagram of a base station according to an exemplary embodiment.

FIG. 10 is a block diagram of a base station according to an exemplary embodiment. Referring to FIG. 10, the base station includes a processor 1002, memory 1001 storing instructions executable by the processor, and a transceiver 1003. The processor 1002 is configured to execute the following instructions of:

acquiring a specified transmission time difference, the specified transmission time difference representing a transmission time difference between a second band and a first band and a frequency of the first band being higher than a frequency of the second band;

determining a first resource position, the first resource position being a first-type resource position configured for a first device to transmit communication data in the first band; and determining a second resource position based on the first resource position, the specified transmission time difference and at least one of at least one second-type resource position of the first band or at least one second-type resource position of the second band, the second resource position being a second-type resource position configured for a second device to transmit feedback data of the communication data.

The first-type resource position is a resource position configured for the first device to transmit data, and the second-type resource position is a resource position configured for the second device to transmit data.

There is also provided a computer-readable storage medium. At least one instruction in the computer-readable storage medium may be executed by the processor of a base station to enable the base station to implement the method for determining a resource position in the abovementioned embodiments.

Figure 11:
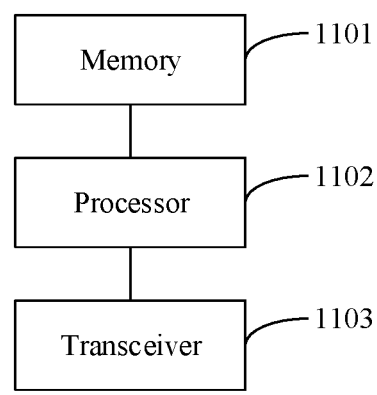
FIG. 11 is a block diagram of a base station according to an exemplary embodiment.

FIG. 11 is a block diagram of a base station according to an exemplary embodiment. Referring to FIG. 11, the base station includes a processor 1102, memory 1101 storing instructions executable by the processor, and a transceiver 1103. The processor 1102 is configured to execute the following instructions of:

receiving a service request, the service request carrying a preset time length and the service request being configured to instruct a first device to transmit communication data to a second device;

acquiring a specified transmission time difference, the specified transmission time difference representing a transmission time difference between a second band and a first band and a frequency of the first band being higher than a frequency of the second band; and determining a first resource position meeting a preset condition based on a first-type resource position of the first band, the specified transmission time difference and at least one of at least one second-type resource position of the first band or at least one second-type resource position of the second band, the first resource position being a first-type resource position configured for the first device to transmit the communication data in the first band and the preset condition including that a feedback delay corresponding to the first resource position is less than the preset time length.

The first-type resource position is a resource position configured for the first device to transmit data, and the second-type resource position is a resource position configured for the second device to transmit data.

There is also provided a computer-readable storage medium. At least one instruction in the computer-readable storage medium may be executed by the processor of a base station to enable the base station to implement the method for determining a resource position in the abovementioned embodiments.

According to the method, apparatus, base station and storage medium provided in the embodiments of the present disclosure, a specified transmission time difference may be acquired, a first resource position configured for a first device to transmit communication data in a first band may be determined, and a second resource position may be determined based on the first resource position, the specified transmission time difference, and at least one of at least one second-type resource position of the first band or at least one second-type resource position of the second band, so that the second device can transmit feedback data of the communication data through the second resource position in addition to the at least one second-type resource position of the second band. A proper second-type resource position may be selected from the second-type resource positions of the first band and the second band based on the specified transmission time difference. Therefore, the condition that the feedback data cannot be transmitted timely and thus there is brought delayed transmission of the feedback data is avoided, and delay is shortened.

It is to be noted that relational terminology "first", "second" and the like in the present disclosure are adopted only to distinguish one entity or operation from another entity or operation but not to require or imply existence of any such practical relationship or sequence between the entities or operations. Terms "include" and "have" or any other variation thereof are intended to cover nonexclusive inclusions, so that a process, method, object or device including a series of elements not only includes those elements, but also includes other elements that are not clearly listed, or further includes elements intrinsic to the process, the method, the object or the device. Under the condition of no more limitations, an element defined by statement "including a/an . . . " does not exclude existence of another element that is the same in a process, method, object or device including the element.

The terminology used in the present disclosure is for the purpose of describing particular embodiments only and is not intended to limit the present disclosure. As used in the present disclosure and the appended claims, the singular forms "a", "an" and "the" are intended to include the plural forms as well, unless the context clearly indicates otherwise. It shall also be understood that the term "and/or" used herein is intended to signify and include any or all possible combinations of one or more of the associated listed items.

Those of ordinary skill in the art should know that implementation of all or part of the operations of the abovementioned embodiments may be completed through hardware and may also be completed through related hardware instructed by a program. The program may be stored in a computer-readable storage medium. The storage medium may be a read-only memory, a magnetic disk, an optical disc or the like.

The above is only some optional embodiments of the embodiments of the present disclosure and not intended to limit the present disclosure. Any modifications, equivalent replacements, improvements and the like made within the spirit and principle of the embodiments of the present disclosure shall fall within the scope of protection of the embodiments of the present disclosure.

What is claimed is:

1. A method for determining a resource position, comprising:
    acquiring, by a base station, a specified transmission time difference, the specified transmission time difference representing a transmission time difference between a second band and a first band, and a frequency of the first band being higher than a frequency of the second band, wherein the base station is a first device or a second device;
    determining, by the base station, a first resource position, the first resource position being a first-type resource position configured for the first device to transmit communication data in the first band; and
    determining, by the base station, a second resource position based on the first resource position, the specified transmission time difference, and at least one of following parameters: at least one second-type resource position of the first band or at least one second-type resource position of the second band, the second resource position being a second-type resource position configured for the second device to transmit feedback data in the second band of the communication data in the first band,
    wherein the first-type resource position is a resource position configured for the first device to transmit the communication data in the first band, and the second-type resource position is a resource position configured for the second device to transmit the feedback data in the second band.

2. The method of claim 1, wherein determining the second resource position based on the first resource position, the specified transmission time difference, and the at least one of the following parameters: the at least one second-type resource position of the first band or the at least one second-type resource position of the second band comprises:
    determining the second resource position based on at least one of following parameters: a second-type resource position after an ending time of the first resource position in the first band or a second-type resource position after a specified time in the second band, the specified time being later than the ending time by the specified transmission time difference.

3. The method of claim 2, wherein determining the second resource position based on the at least one of the following parameters: the second-type resource position after the ending time of the first resource position in the first band or the second-type resource position after the specified time in the second band comprises:
    determining, based on the second-type resource position after the ending time in the first band and the second-type resource position after the specified time in the second band, a second-type resource position at a minimum distance from the first resource position as the second resource position.

4. The method of claim 1, wherein determining the second resource position based on the first resource position, the specified transmission time difference, and the at least one of the following parameters: the at least one second-type resource position of the first band or the at least one second-type resource position of the second band comprises:
    in response to determining that the specified transmission time difference is greater than a preset time difference, determining the second resource position from the at least one second-type resource position of the first band based on the first resource position and the specified transmission time difference; or
    in response to determining that the specified transmission time difference is not greater than a preset time difference, determining the second resource position from the at least one second-type resource position of the second band based on the first resource position and the specified transmission time difference.

5. The method of claim 1, wherein acquiring the specified transmission time difference comprises:
    receiving a transmission capability of a terminal, the transmission capability representing a magnitude of a transmission time difference of the terminal; and
    determining the specified transmission time difference based on the transmission capability of the terminal, or
    determining the specified transmission time difference corresponding to a lower transmission capability between a transmission capability of the base station and the transmission capability of the terminal.

6. The method of claim 5, wherein the transmission capability is a transmission time difference;
    determining the specified transmission time difference based on the transmission capability of the terminal comprises:
        determining the transmission time difference of the terminal as the specified transmission time difference; and
    determining the specified transmission time difference corresponding to the lower transmission capability between the transmission capability of the base station and the transmission capability of the terminal comprises:
        selecting a greater transmission time difference from a transmission time difference of the base station and the transmission time difference of the terminal as the specified transmission time difference.

7. The method of claim 5, wherein the transmission capability is a level of the transmission time difference;
    determining the specified transmission time difference based on the transmission capability of the terminal comprises:
        based on the level of the transmission time difference of the terminal, determining any transmission time difference of the level as the specified transmission time difference; and
    determining the specified transmission time difference corresponding to the lower transmission capability between the transmission capability of the base station and the transmission capability of the terminal comprises:

determining a level of a greater transmission time difference based on a level of the base station and the level of the transmission time difference of the terminal, and determining any transmission time difference of the level corresponding to the greater transmission time difference as the specified transmission time difference.

8. The method of claim 1, wherein the first device is the base station, and the second device is a terminal; and
wherein the method further comprises:
transmitting the communication data to the terminal through the first resource position, and
receiving the feedback data transmitted by the terminal through the second resource position.

9. The method of claim 1, wherein the first device is a terminal, and the second device is the base station; and
wherein the method further comprises:
receiving the communication data transmitted by the terminal through the first resource position, and
transmitting the feedback data to the terminal through the second resource position.

10. A method for determining a resource position, comprising:
receiving, by a base station, a service request, the service request carrying a preset time length and the service request being configured to instruct a first device to transmit communication data to a second device, wherein the base station is the first device or the second device;
acquiring, by the base station, a specified transmission time difference, the specified transmission time difference representing a transmission time difference between a second band and a first band, and a frequency of the first band being higher than a frequency of the second band; and
determining, by the base station, a first resource position meeting a preset condition based on a first-type resource position of the first band, the specified transmission time difference, and at least one of following parameters: at least one second-type resource position of the first band or at least one second-type resource position of the second band, the first resource position being a first-type resource position configured for the first device to transmit the communication data in the first band, and the preset condition comprising that a feedback delay corresponding to the first resource position is less than the preset time length,
wherein the first-type resource position is a resource position configured for the first device to transmit the communication data in the first band, and the second-type resource position is a resource position configured for the second device to transmit feedback data in the second band.

11. The method of claim 10, wherein determining the first resource position meeting the preset condition based on the first-type resource position of the first band, the specified transmission time difference, and the at least one of the following parameters: the at least one second-type resource position of the first band or the at least one second-type resource position of the second band comprises:
determining a first alternative resource position based on the first-type resource position of the first band;
determining a feedback delay corresponding to the first alternative resource position based on the first alternative resource position, the specified transmission time difference, and the at least one of the following parameters: the at least one second-type resource position of the first band or the at least one second-type resource position of the second band; and
in response to determining that the feedback delay is less than the preset time length, determining that the first alternative resource position meets the preset condition.

12. The method of claim 11, further comprising:
in response to determining that the feedback delay is not less than the preset time length, determining that the first alternative resource position does not meet the preset condition.

13. The method of claim 11, wherein determining the feedback delay corresponding to the first alternative resource position based on the first alternative resource position, the specified transmission time difference, and the at least one of the following parameters: the at least one second-type resource position of the first band or the at least one second-type resource position of the second band comprises:
determining a second alternative resource position corresponding to the first alternative resource position based on the first alternative resource position and at least one of following parameters: a first second-type resource position after an ending time of the first alternative resource position in the first band or a first second-type resource position after an alternative specified time in the second band, the alternative specified time being later than the ending time by the specified transmission time difference; and
determining a distance between the first alternative resource position and the second alternative resource position as the feedback delay.

14. The method of claim 13, wherein determining the second alternative resource position corresponding to the first alternative resource position based on the first alternative resource position and the at least one of the following parameters: the first second-type resource position after the ending time in the first band or the first second-type resource position after the alternative specified time in the second band comprises:
determining the first second-type resource position after the ending time in the first band as the second alternative resource position;
determining the first second-type resource position after the alternative specified time in the second band as the second alternative resource position; or
determining a second-type resource position at a minimum distance from the first alternative resource position as the second alternative resource position based on the first second-type resource position after the ending time in the first band and the first second-type resource position after the alternative specified time in the second band.

15. The method of claim 10, wherein acquiring the specified transmission time difference comprises:
receiving a transmission capability of a terminal, the transmission capability representing a magnitude of a transmission time difference of the terminal; and
determining the specified transmission time difference based on the transmission capability of the terminal, or
determining the specified transmission time difference corresponding to a lower transmission capability between a transmission capability of the base station and the transmission capability of the terminal.

16. The method of claim 15, wherein the transmission capability is a transmission time difference;

determining the specified transmission time difference based on the transmission capability of the terminal comprises:
  determining the transmission time difference of the terminal as the specified transmission time difference; and
determining the specified transmission time difference corresponding to the lower transmission capability between the transmission capability of the base station and the transmission capability of the terminal comprises:
  selecting a greater transmission time difference from a transmission time difference of the base station and the transmission time difference of the terminal as the specified transmission time difference.

17. The method of claim 15, wherein the transmission capability is a level of the transmission time difference;
determining the specified transmission time difference based on the transmission capability of the terminal comprises:
  based on the level of the transmission time difference of the terminal, determining any transmission time difference of the level as the specified transmission time difference; and
determining the specified transmission time difference corresponding to the lower transmission capability between the transmission capability of the base station and the transmission capability of the terminal comprises:
  determining a level of a greater transmission time difference based on a level of the base station and the level of the transmission time difference of the terminal, and determining any transmission time difference of the level corresponding to the greater transmission time difference as the specified transmission time difference.

18. A base station, comprising:
a processor; and
memory storing instructions executable by the processor, wherein the processor is configured to:
acquire a specified transmission time difference, the specified transmission time difference representing a transmission time difference between a second band and a first band, and a frequency of the first band being higher than a frequency of the second band;
determine a first resource position, the first resource position being a first-type resource position configured for a first device to transmit communication data in the first band; and
determine a second resource position based on the first resource position, the specified transmission time difference and at least one of following parameters: at least one second-type resource position of the first band or at least one second-type resource position of the second band, the second resource position being a second-type resource position configured for a second device to transmit feedback data in the second band of the communication data in the first band,
wherein the first-type resource position is a resource position configured for the first device to transmit the communication data in the first band, and the second-type resource position is a resource position configured for the second device to transmit the feedback data in the second band.

19. A base station, comprising:
a processor; and
memory storing instructions executable by the processor for implementing the method for determining a resource position according to claim 10.

20. A non-transitory computer-readable storage medium, storing at least one instruction that, when loaded and executed by a processor, implements the operations in the method for determining a resource position according to claim 1.

* * * * *